Figure 1A:
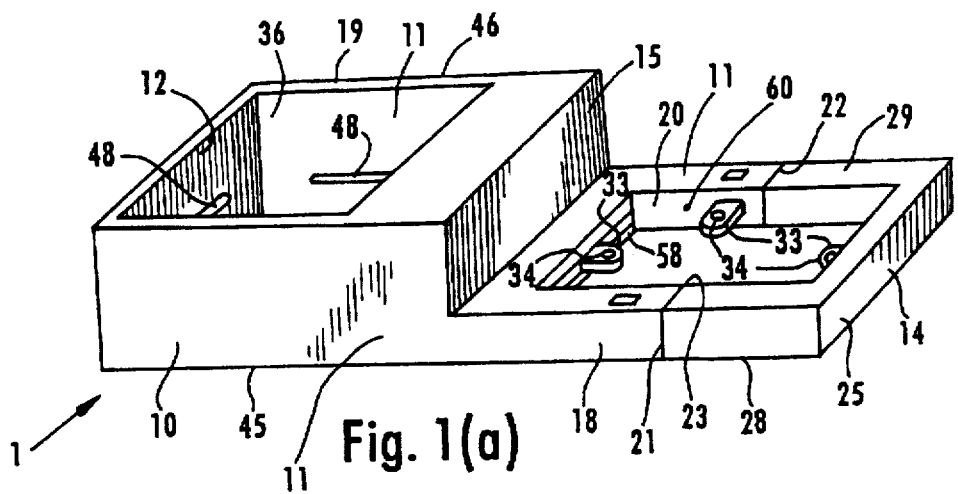

United States Patent [19]

O'Leary et al.

[11] Patent Number: 5,699,221

[45] Date of Patent: Dec. 16, 1997

[54] SUPPORT BRACKET FOR AN ELECTRICAL UNIT

[75] Inventors: Gerald Timothy O'Leary, Dublin; Patrick Joseph Duffy, Bray; Oliver St. Clair Hood, Dublin, all of Ireland

[73] Assignee: Paralight Limited, Dublin, Ireland

[21] Appl. No.: 507,411

[22] PCT Filed: Feb. 24, 1994

[86] PCT No.: PCT/IE94/00010

§ 371 Date: Aug. 24, 1995

§ 102(e) Date: Aug. 24, 1995

[87] PCT Pub. No.: WO94/19853

PCT Pub. Date: Sep. 1, 1994

[30] Foreign Application Priority Data

Feb. 24, 1993 [IE] Ireland .................. S93 0138
Jun. 4, 1993 [IE] Ireland .................. 93 0427

[51] Int. Cl.[6] ........................................ H02G 3/18
[52] U.S. Cl. ............................. 361/160; 174/66
[58] Field of Search ...................... 174/48, 49, 50, 174/52.1, 53–58, 66, 67; 307/155, 156; 361/142, 160, 819

[56] References Cited

U.S. PATENT DOCUMENTS

| 2,392,445 | 1/1946 | Anderson | 174/66 |
| 3,418,420 | 12/1968 | Zerwes | 174/53 |
| 3,522,595 | 8/1970 | White | 174/66 |
| 3,588,415 | 6/1971 | Berne | 174/66 |
| 3,597,526 | 8/1971 | Boatwright et al. | 174/66 |
| 4,027,097 | 5/1977 | Gillemot | 174/66 |
| 4,163,882 | 8/1979 | Baslow | 174/57 |
| 4,318,094 | 3/1982 | Ferrigno, Jr. | |
| 5,294,838 | 3/1994 | Juravich | 307/117 |

FOREIGN PATENT DOCUMENTS

| 0 384 926 | 9/1990 | European Pat. Off. |
| 0 433 592 | 6/1991 | European Pat. Off. |
| 59-72705 | 4/1984 | Japan |

OTHER PUBLICATIONS

Hans Sauer, "Relais–Lexikon", p. 206, 1985, Verlag GmbH Heidelberg.

Primary Examiner—Fritz Fleming
Attorney, Agent, or Firm—Lowe, Price, LeBlanc & Becker

[57] ABSTRACT

A support bracket for connecting an auxiliary electrical unit to an in situ unit, comprising a mounting means for locating between the in situ unit and an outlet box (hereinafter referred to as a patress box) or a wall to which the in situ unit is originally mounted, and for mounting the in situ unit to the patress box or wall. A support means extends from the mounting means for supporting the auxiliary unit. A cable accommodating means is provided for accommodating a cable from the patress box or wall through the support bracket to the in situ unit. One of the cable accommodating means and the mounting means is adapted to permit location of the mounting means between the in situ unit and the patress box or wall, and for permitting mounting of the in situ unit on the mounting means without disconnection of the cable from the in situ unit. A communicating means is provided for accommodating an electrical wire from the in situ unit to the auxiliary unit.

20 Claims, 9 Drawing Sheets

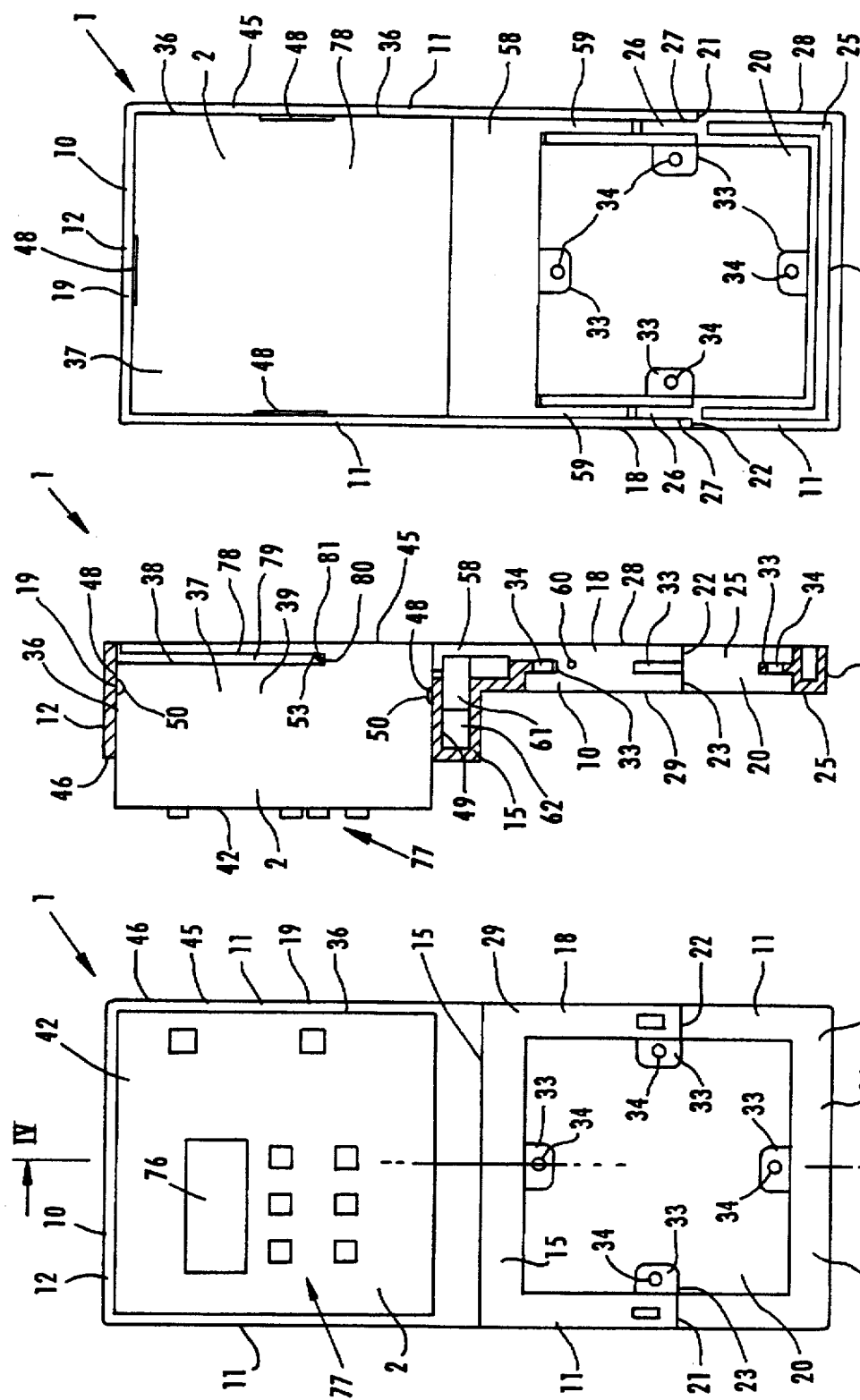

SUPPORT BRACKET FOR AN ELECTRICAL UNIT

The present invention relates to a support bracket for an electrical unit, and in particular, to a support bracket for connecting an electrical unit to an in situ electrical unit.

Throughout this specification the term "in situ unit" is to be interpreted as meaning any electrical unit which is already installed, such as, for example, an electrical switch unit of a circuit or an electrical socket unit either of which may be mounted on a wall and connected to a cable. The electrical switch unit or socket unit may be mounted directly onto a wall, or may be mounted in or on a patress box, which may in turn be flush mounted in the wall or surface mounted on to the wall. The in situ unit may be of the type which comprises a cover for closing an outlet box, hereinafter referred to as a patress box, and the switch or socket as the case may be would be located in the cover.

There are many occasions when it is desirable to connect an auxiliary unit to an in situ unit, for example, for security reasons, it is desirable that an electrically powered light in a room should be switched on and off periodically while a house is vacant to give the impression that people are present in the house. This in general, requires purchasing an electrically powered timer unit which is connected into a mains electricity supply, for example, connected to or plugged into an electrical power socket. A table lamp is then in turn connected to or plugged into the timer unit. An alternative to using the table lamp is to connect a timer unit into a circuit of a room light, for example, a room light suspended from a ceiling, or a wall light. However, whether one adopts the table lamp alternative, or the room light alternative, once the timer unit has to be connected into the light circuit, or the socket circuit, the services of a qualified electrician, in general are called for.

It is also desirable in many cases, that an immersion heater in a domestic hot water supply tank should be timer controlled. Where the immersion heater is powered through a conventional immersion heater switch, in order to connect a timer into the immersion heater circuit, it is necessary to break the circuit and connect a timer which includes one or more relays for switching on and off power to the immersion heater. This likewise is a relatively complex task, and because it requires breaking a circuit to the immersion heater, in general, calls for the services of a qualified electrician.

It is also in many cases desirable to connect a dimmer switch to an in situ switch of an electrically powered light circuit. In practice, this requires removing and disconnecting the in situ switch, and either replacing the entire in situ switch with a combination switch and dimmer unit, or alternatively, mounting a dimmer switch adjacent the in situ switch and connecting the dimmer switch to the electrical cable feeding the in situ switch. Irrespective of which course of action is taken, the in situ switch must be removed and disconnected from the cable feeding the switch. This, in general, calls for the services of a qualified electrician.

It may also be desirable that a metering device for the transmission of data to a remote location be connected to an electrical system at a convenient location, such as, for example, adjacent an in situ unit.

It may also be desirable in many instances to connect an auxiliary unit which may be activated remotely by a radio signal, or indeed, a telephone signal for activating an electrical circuit, such for example, an electrical circuit powering a central heating system and air conditioning unit or the like. In such cases, it is desirable that the remotely operable auxiliary unit should be readily easily connectable into the circuit adjacent an in situ unit, for example, adjacent an in situ switch of the circuit.

There is therefore a need for a support bracket for facilitating connection of an auxiliary unit, for example, a timer, a dimmer switch, or any other electrical component or apparatus to an in situ electrical unit, for example, an in situ switch, socket or the like in a simple manner with minimum requirement for electrical expertise, and without the need for drilling holes in a wall, forming a recess in the wall for accommodating a patress box or without the need for mounting an additional patress box to a wall by drilling and screwing.

Accordingly, it is an object of the invention to provide a support bracket for mounting and connecting an auxiliary unit to an in situ unit so that the auxiliary unit may be simply, and readily easily mounted and connected to the in situ unit with the minimum amount of electrical expertise being required, and with the minimum amount of mechanical fitting, masonry work, carpentry work and the like being required.

Another object of the invention is to provide such a support bracket which facilitates mounting the auxiliary unit to the in situ unit without the need for disconnecting a cable or all of the cables which supply the in situ unit.

A subsidiary object of the invention is to provide a support bracket for connecting an auxiliary unit to an in situ unit whereby the support bracket also comprises the auxiliary unit, and it is further a subsidiary object of the invention to provide the support bracket with an auxiliary unit which comprises a relay for controlling a circuit into which the auxiliary unit is connected, and which also comprises a control circuit for operating the relay. A further subsidiary object of the invention is to provide the auxiliary unit with a power supply independent of the circuit into which the auxiliary unit is connected.

A further subsidiary object of the invention is to provide a timer unit which comprises a relay which may be powered by a relatively low voltage, and preferably, by a voltage as low as 1.25 to 1.5 volts. For example, it is an object of the invention that the timer unit should be powerable by a battery of approximately 1.5 volts, and preferably, a standard alkaline AA battery.

It is also a subsidiary object of the invention to provide a timer nit which is suitable for switching inductive loads, for example, energy saving light bulbs, fluorescent lighting, dimmer circuits for lighting, and the like, and preferably, such timer unit should be suitable for use with the support bracket.

According to the invention there is provided a support bracket for connecting an auxiliary electrical unit to an in situ unit, wherein the support bracket comprising a mounting means for mounting the support bracket to the in situ unit, a support means for supporting the auxiliary unit, a cable accommodating means for accommodating a cable through the support bracket to the in situ unit, one of the cable accommodating means and mounting means permitting mounting of the support bracket to the in situ unit without disconnection of the cable from the in situ unit, and a communicating means for accommodating an electrical wire from the in situ unit to the auxiliary unit.

The advantages of the invention are many, a particularly important advantage of the invention is that the support bracket can be mounted and connected to the in situ unit without the need for disconnection of the cable feeding the in situ unit. By virtue of this fact the support bracket and auxiliary unit can be connected to the in situ unit with minimum electrical expertise, and can be connected without the need for a skilled electrician. Furthermore, because the support bracket is mounted directly onto the in situ switch, there is no need for any other fixing arrangements for securing the auxiliary unit or the support bracket to the wall. Thus, there is no need for drilling holes in the wall or forming recesses in the wall for securing or accommodating a patress box or any other mounting arrangement necessary for an auxiliary unit. Accordingly, connection of the support bracket and auxiliary unit to the in situ unit is a relatively simple task which can be accomplished in minimum time with minimum effort and with minimum skills and at minimum cost.

Preferably, the cable accommodating means extends through the mounting means for accommodating a cable feeding the in situ unit through the mounting means.

Advantageously, the cable accommodating means is formed by a cable accommodating aperture defined by the mounting means. This provides a relatively convenient and safe construction of support bracket.

In one aspect of the invention an entry means is formed in the mounting means for permitting entry of a cable into the cable accommodating means. Preferably, the entry means is an entry gap. Advantageously, a closure means is provided for closing the entry gap, for safety purposes.

In one aspect of the invention the closure means is engagable with the mounting means. Advantageously, the closure means is releasably engagable with the mounting means.

In another aspect of the invention the mounting means comprises a mounting frame extending around the cable accommodating means. This provides a particularly advantageous and safe construction of support bracket in that, in general, access to the electrical connections of the in situ unit is prevented after the support bracket is secured between the in situ unit, and the wall or a patress box to which the in situ unit is mounted.

Advantageously, the entry gap is formed in the mounting frame. Preferably, the closure means comprises a closure member forming part of the mounting frame, for preventing access to electrical connections of the in situ unit after the support bracket has been mounted thereto.

In one aspect of the invention the closure member is hingedly connected to the mounting frame, the closure member being hingeable from an open position with the entry gap open to a closed position with the entry gap closed. Preferably, the closure member forms part of two adjacent legs of the mounting frame, one end of the closure member being hingeably connected to the mounting frame, and the other end of the closure member being releasably engagable with the mounting frame. Advantageously, a retaining means is provided for retaining the closure means in engagement with the mounting frame or in the closed position.

In another aspect of the invention at least one screw accommodating opening is formed in the mounting frame for facilitating securing of the mounting frame to the in situ unit. Preferably, two screw accommodating openings are provided in the mounting frame.

Advantageously, one of the screw accommodating openings is located on the closure means for retaining the closure means in engagement with the mounting frame or in the closed position when the mounting frame is mounted to the in situ unit.

In a preferred aspect of the invention the mounting means defines portion of the periphery of the in situ unit for safety and aesthetic purposes.

In another aspect of the invention the mounting means defines a pair of opposite engagement faces, one of the engagement faces being for engaging a face of the in situ unit from which the cable extends. Preferably, the other engagement face is for engaging a patress box or wall to which the in situ unit is mounted.

In a preferred embodiment of the invention the support bracket is reversible so that either engagement face may engage the in situ unit, for facilitating use of the support bracket with a surface mounted or recess mounted patress box.

For convenience, the mounting means is engagable with the in situ unit in at least two different orientations corresponding to different orientations of the support bracket relative to the in situ unit.

It is particularly preferable that the support bracket should be mountable in at least two different orientations at 90° to each other relative to the in situ unit.

In a particularly convenient aspect of the invention the support bracket is for mounting an auxiliary unit to an in situ unit wherein the in situ unit is of four sided shape, the mounting means defining three sides of the in situ unit.

Preferably, the support means comprises a support frame extending from the mounting means. Advantageously, the support frame defines a receiving aperture for receiving the auxiliary unit.

In one embodiment of the invention the support frame defines a first face and an opposite second face, the first face being substantially co-planar with one of the engagement faces of the mounting means. Preferably, the support frame comprises a side wall, the side wall extending perpendicularly from the first face, and defining part of the receiving aperture. Advantageously, the receiving aperture defines the outer periphery of a side wall of the auxiliary unit.

Preferably, a securing means is provided in the support means for securing the auxiliary unit in the support means. Preferably, the securing means releasably secures the auxiliary unit in the support means.

In a preferred aspect of the invention the communicating means extends between the mounting means and the support means. Preferably, the communicating means extends between the cable accommodating aperture and the receiving aperture. Advantageously, the communicating means is formed by a communicating opening in a portion of the support bracket which defines the cable accommodating aperture and the receiving aperture, the communicating opening extending between the said apertures.

In one aspect of the invention a locating means is provided for locating a wire in the communicating means. Preferably, the locating means comprises a cover member for extending over the communicating means. Advantageously, the cover member is pivotally connected to the support bracket and is pivotal from an open position spaced apart from the communicating means for entry of a wire into the communicating means to a closed position with the cover member substantially closing the communicating means for retention of the wire therein.

In one embodiment of the invention an auxiliary unit is mounted in the support means.

In an alternative embodiment of the invention the support means forms part of a housing of the auxiliary unit. In another embodiment of the invention the auxiliary unit comprises a relay and a control means for controlling operation of the relay, the relay being for connection to the in situ unit through the communicating means.

Preferably, the control means comprises a high current gain control circuit to facilitate triggering of the relay with a relatively low current. Advantageously, the control circuit comprises a pair of transistors connected in compound configuration for triggering the relay.

In one embodiment of the invention a coil of the relay is connected in series with a coil switching transistor forming one of the transistors connected in compound configuration, across an operating voltage, the other of the transistors acting as a driver transistor for switching on the coil switching transistor.

In another embodiment of the invention the coil switching transistor has a relatively low saturation voltage characteristic. Advantageously, the driver transistor is a high current gain transistor.

Preferably, the relay is a bi-stable remanent relay operable by a pair of relay coils, each relay coil having an associated pair of transistors connected in compound configuration. Advantageously, the control circuit comprises a microcontroller, the driver transistors being operated by the microcontroller through a steering circuit which receives a control signal from the microcontroller.

It is preferable that the auxiliary unit is powered independently of the in situ unit, and in particular, it is preferable that the auxiliary unit is powered by a battery of approximately 1.5 volts, which provides an operating voltage of approximately 1.25 to 1.5 volts, the saturation voltage of each coil switching transistor being such as to leave approximately 1 volt across each relay coil.

In one aspect of the invention the auxiliary unit comprises a timing means, the control circuit being responsive to the timing means for switching the relay from one state to another. Preferably, the timing means is provided in the microcontroller.

Additionally, the invention provides a timer unit comprising a relay, a timing means for timing a time period at the end of which the state of the relay is to be changed, and a control circuit for operating the relay, the control circuit being responsive to the timing means for operating the relay. Preferably, the control circuit is a high current gain circuit to facilitate triggering of the relay with a relatively low current. Advantageously, the control circuit comprises a pair of transistors connected in compound configuration for triggering the relay.

In one embodiment of the invention a coil of the relay is connected in series with a coil switching transistor forming one of the transistors connected in compound configuration, across an operating voltage, the other of the transistors acting as a driver transistor for switching on the coil switching transistor.

Preferably, the coil switching transistor has a relatively low saturation voltage characteristic, for maximizing the voltage available across the relay coil. Indeed, it is preferable that the saturation voltage of the transistor should not exceed 0.25 volts, and preferably should be less than 0.25 volts to provide approximately 1 volt across the relay coil to facilitate an aging battery.

In another embodiment of the invention the driver transistor is a high current gain transistor to enable triggering of the relay with a minimum triggering current typically, 50 microamps or less.

In one aspect of the invention the relay is a bi-stable remanent relay operable by a pair of relay coils, each relay coil having an associated pair of transistors connected in compound configuration. Preferably, the control circuit comprises a microcontroller, the driver transistors being operated by the microcontroller through a steering circuit which receives a control signal from the microcontroller. Advantageously, the timer unit is powered by a battery of approximately 1.5 volts, which provides an operating voltage of approximately 1.25 to 1.5 volts, the saturation voltage of the coil switching transistor being such as to leave approximately 1 volt across each relay coil.

Figure 1B:
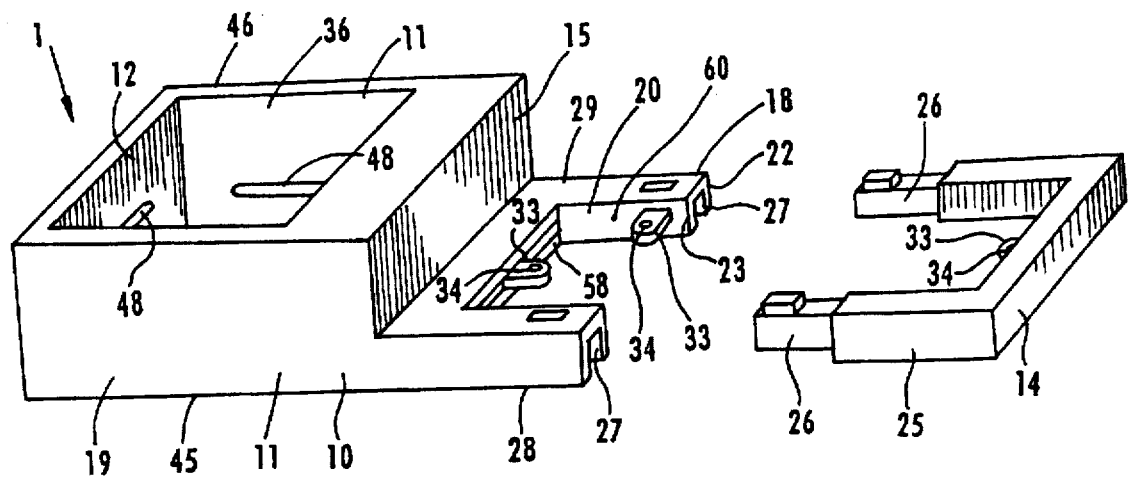
Figure 16:
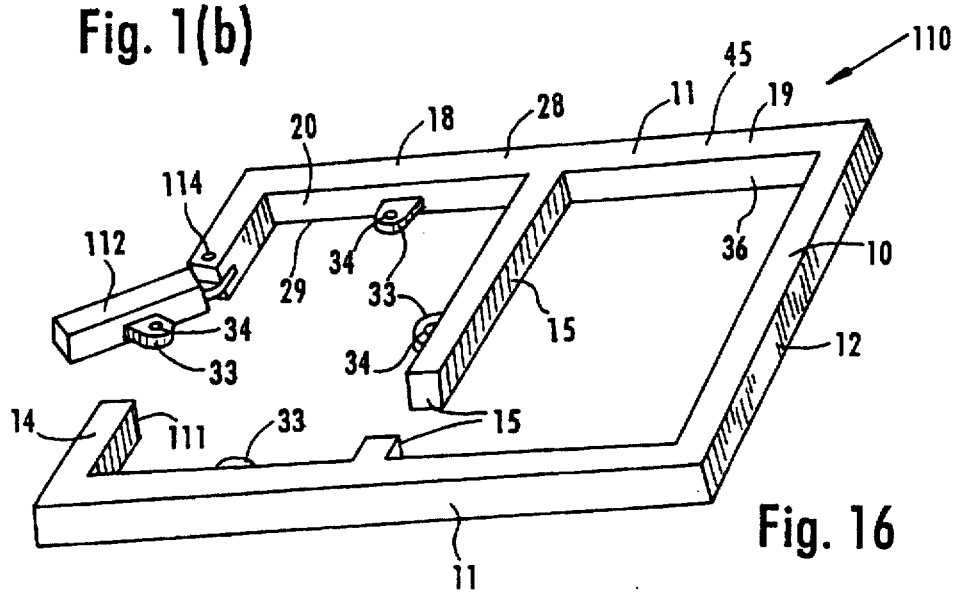
Figure 2:
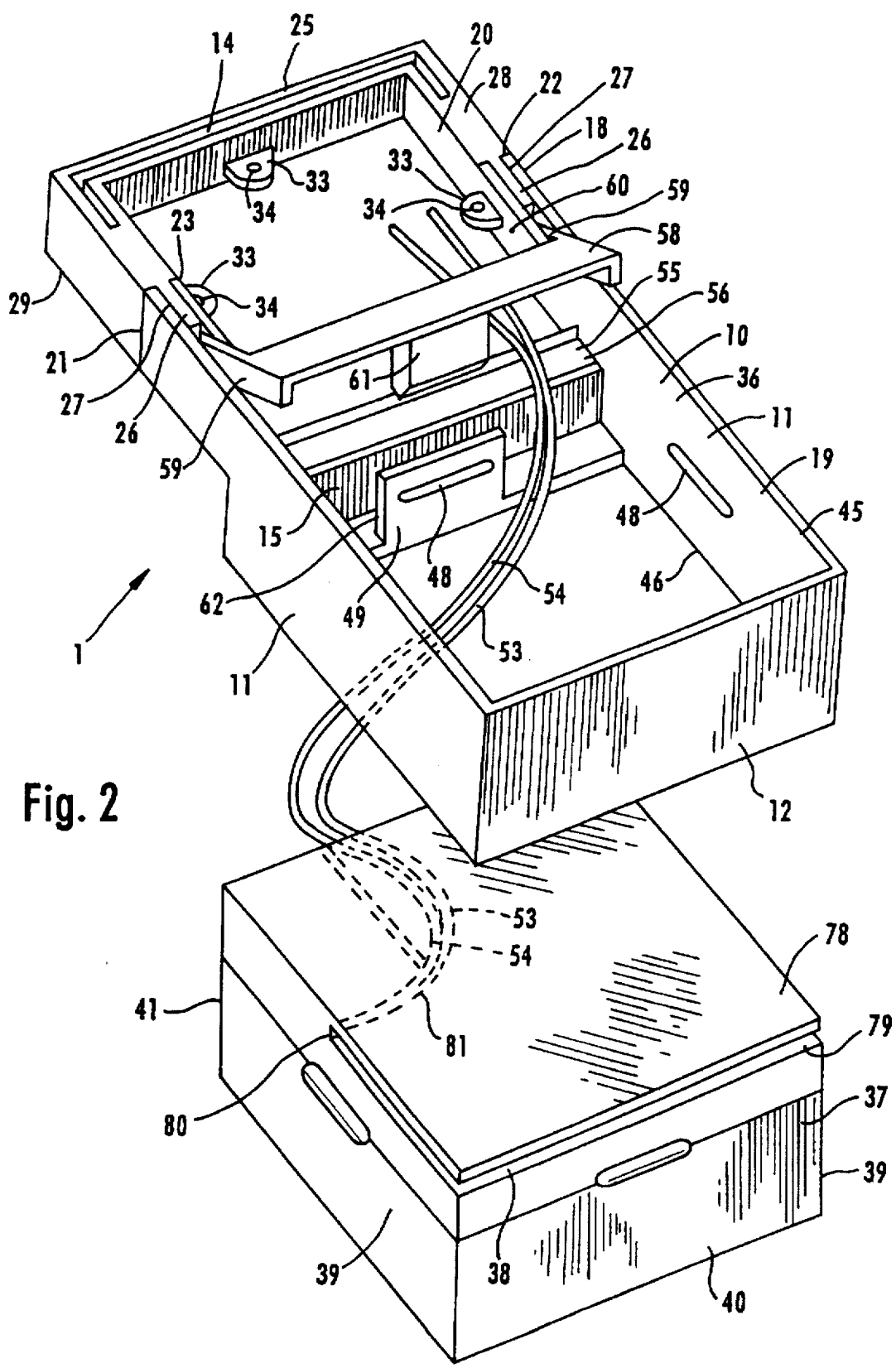
Figure 14:
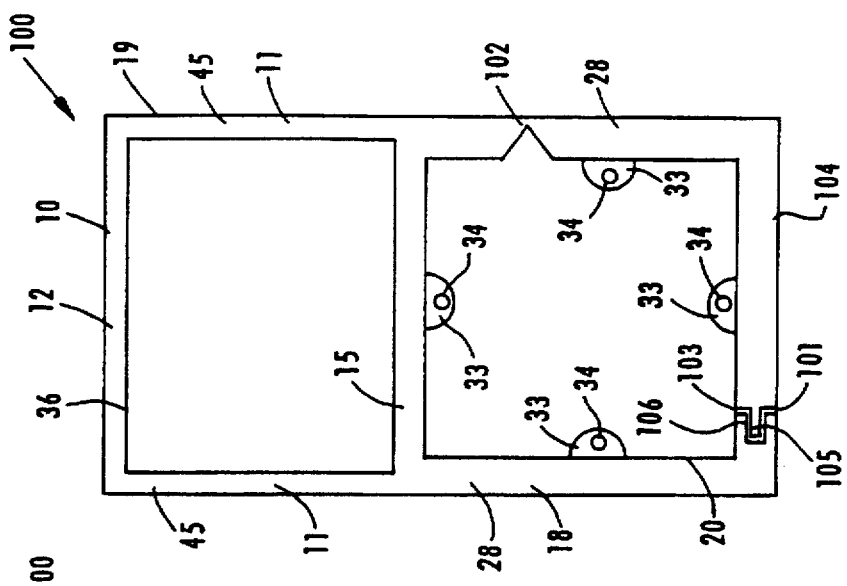
Figure 15:
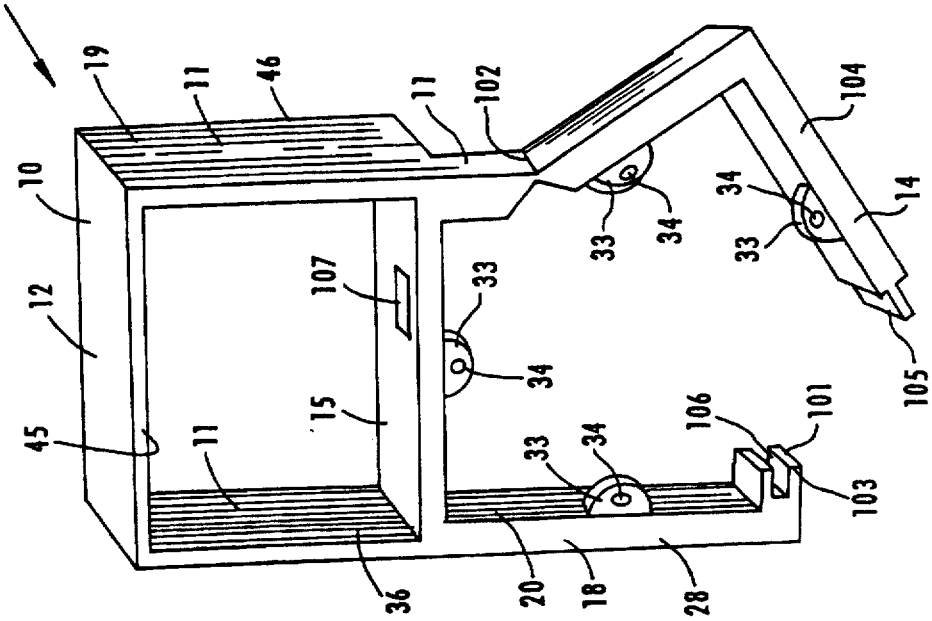
Figure 6:
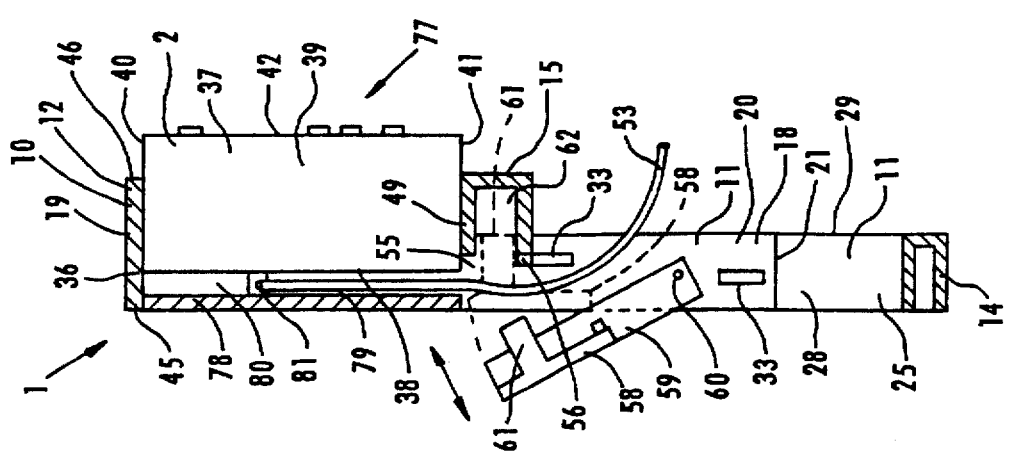
Figure 9:
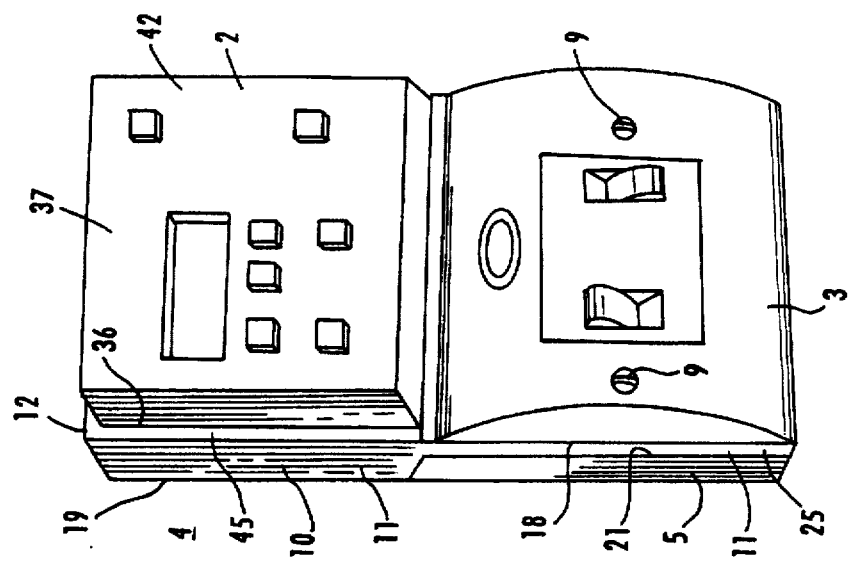
Figure 8:
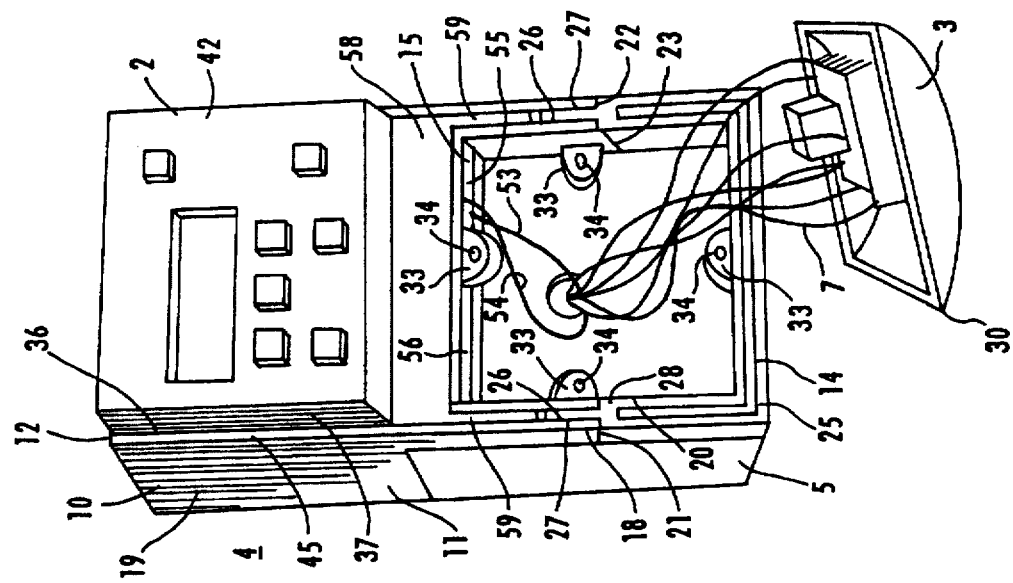
Figure 7:
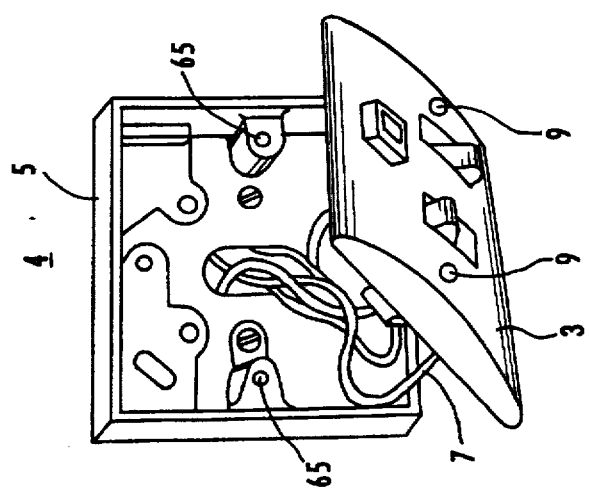
Figure 10:
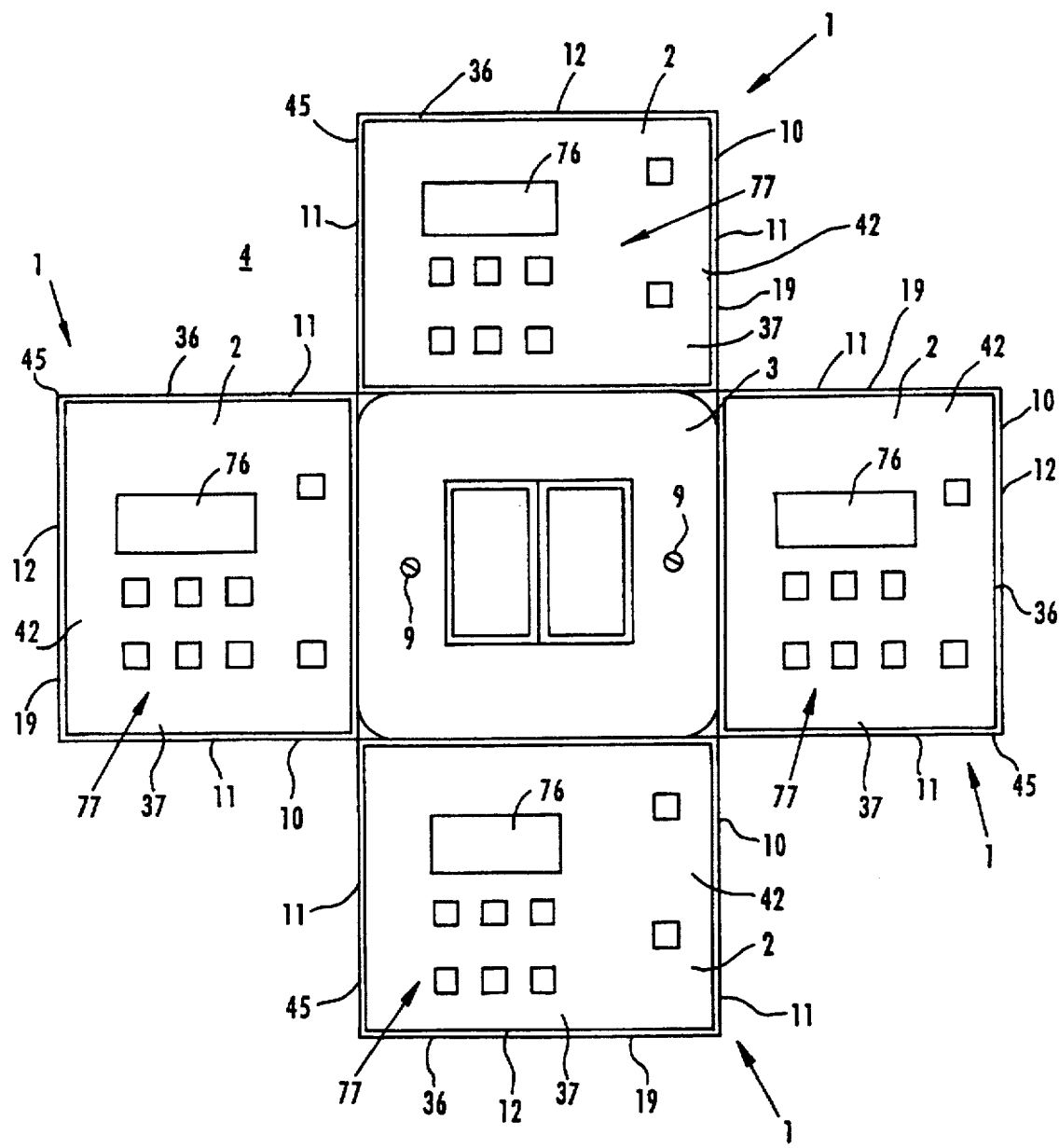
Figure 11:
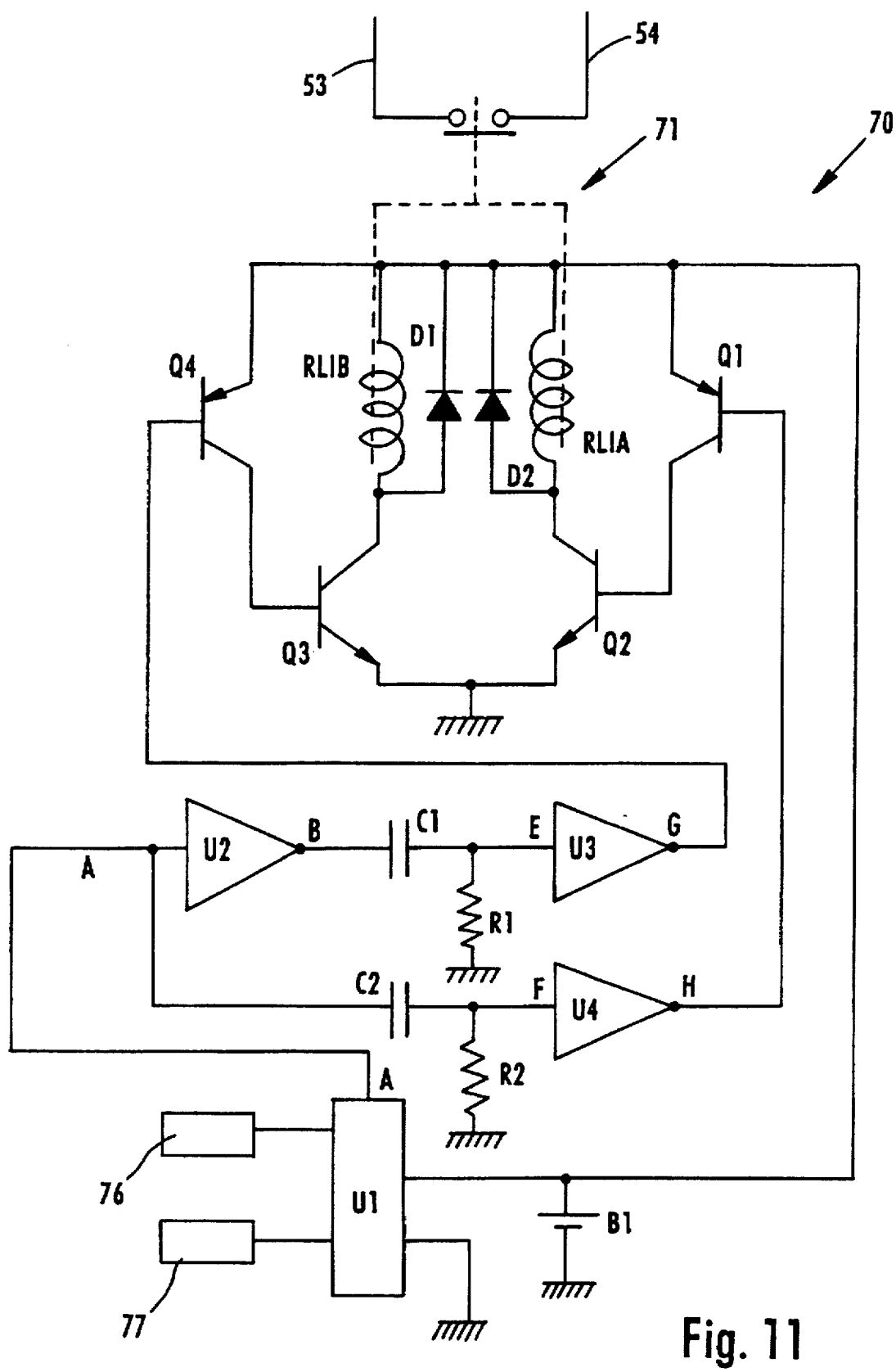
Figure 12:
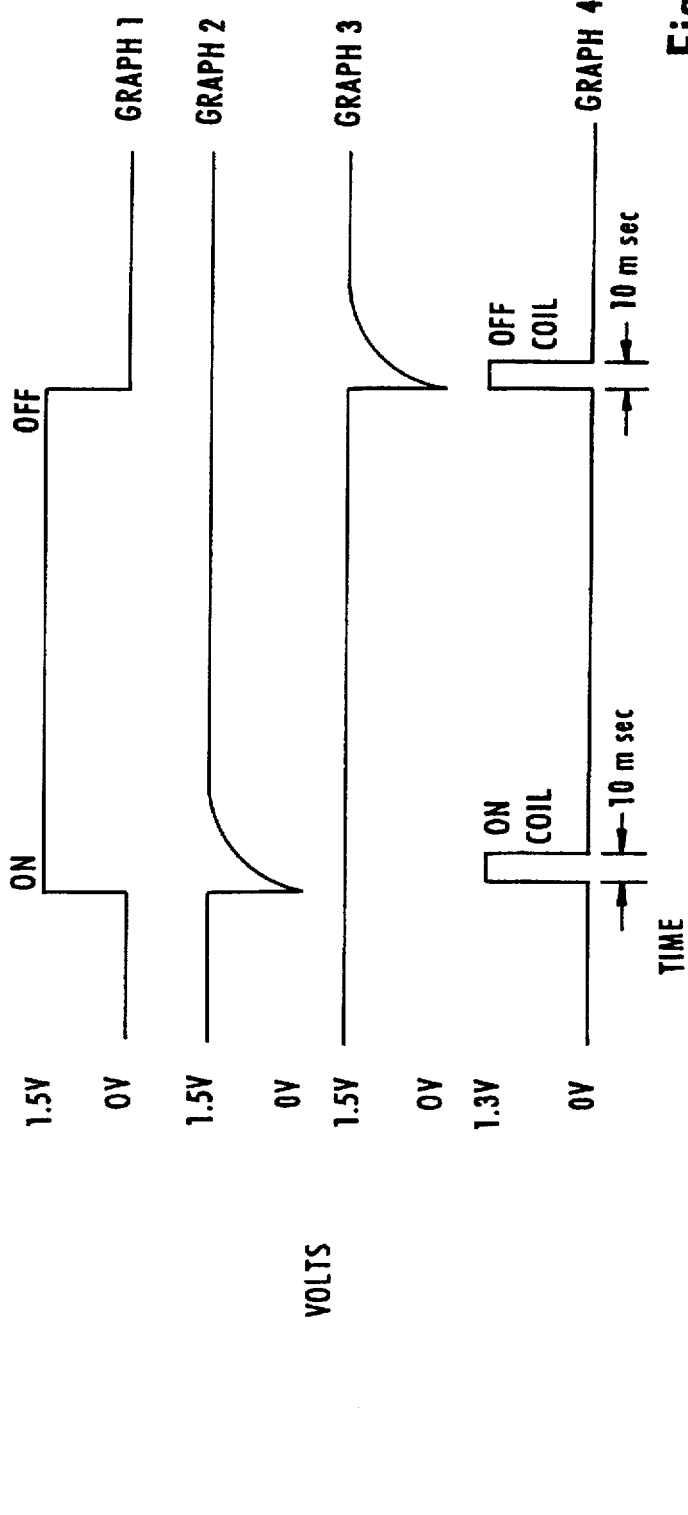
Figure 13:
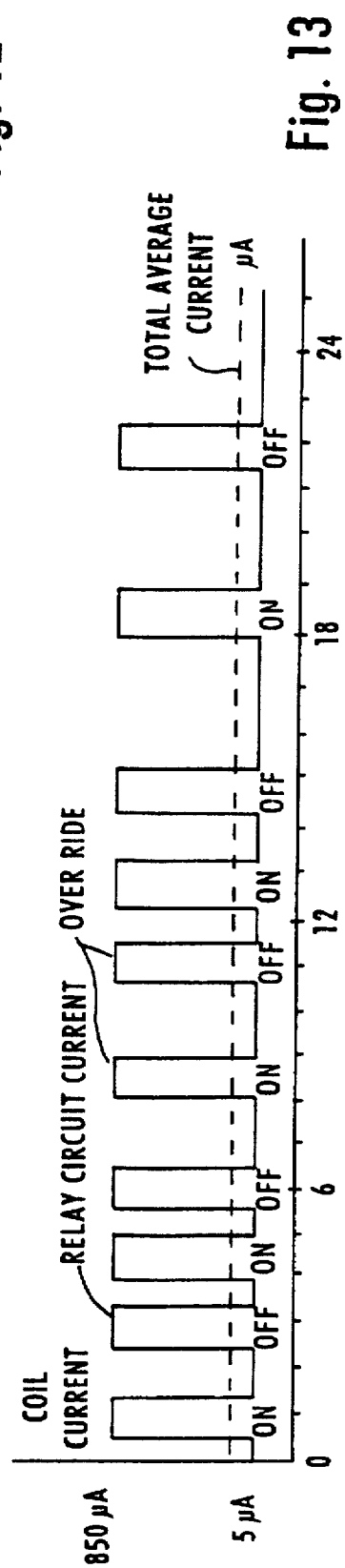
Figure 17:
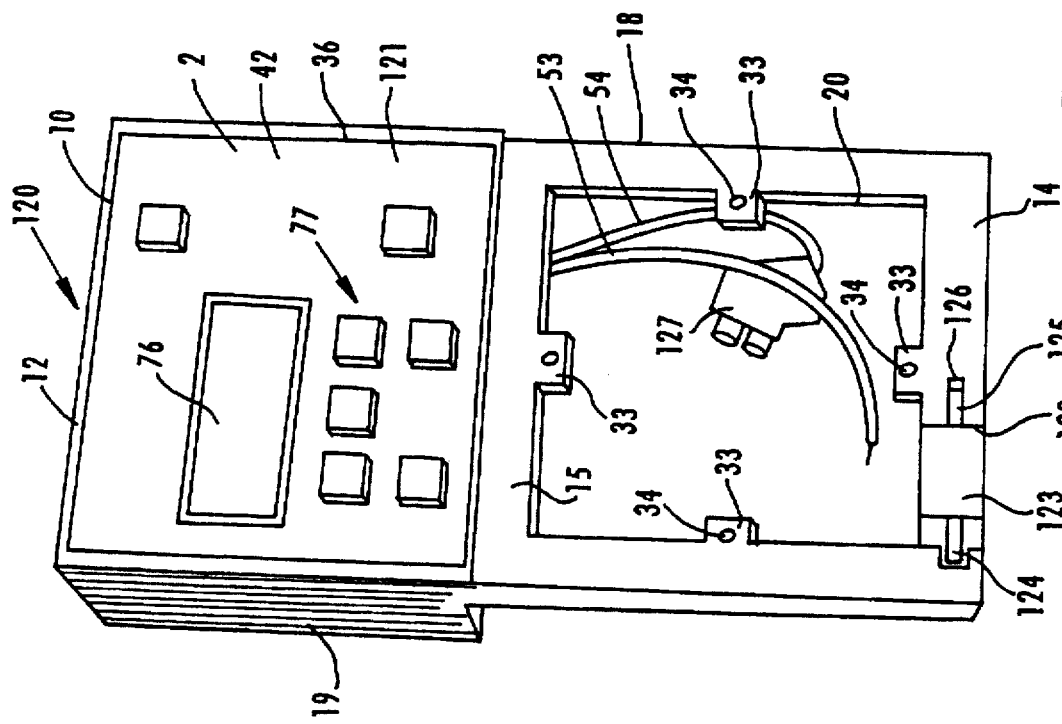
Figure 18:
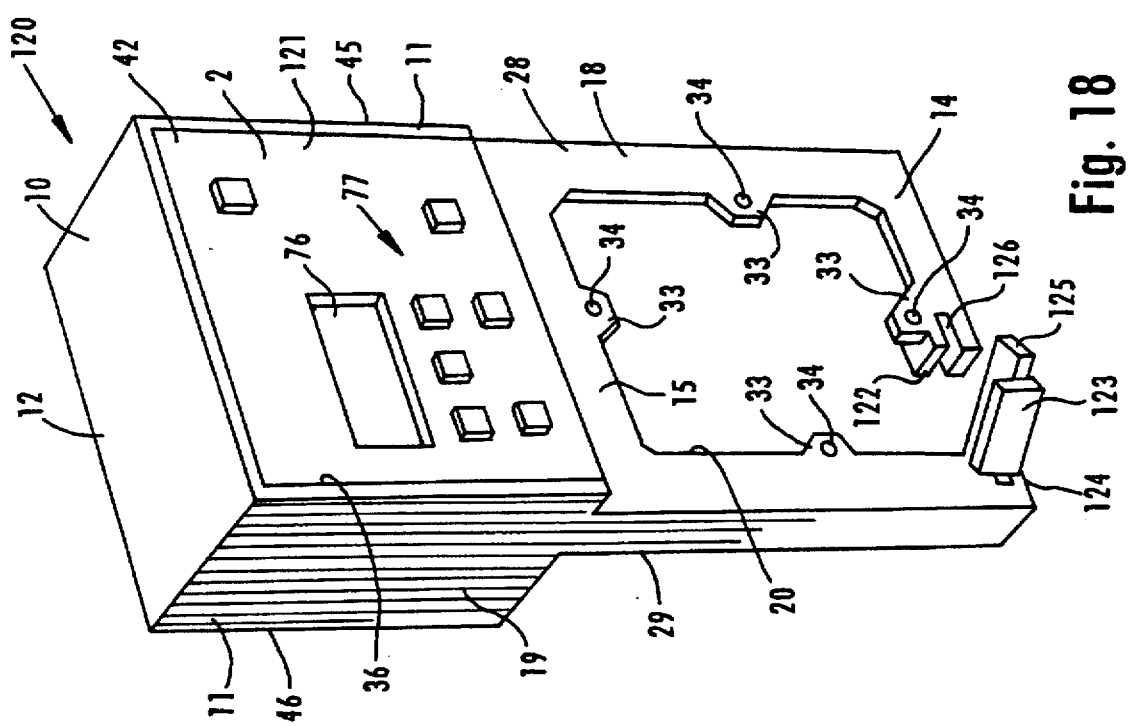

The invention will be more clearly understood from the following description of some preferred embodiments thereof which are given by way of example only, with reference to the accompanying drawings, in which:

FIGS. 1(a) and (b) are perspective views of a support bracket according to the invention for connecting an auxiliary unit to an in situ unit, FIG. 2 is another perspective view of the support bracket of FIG. 1 illustrating the auxiliary unit, FIG. 3 is a front elevational view of the support bracket of FIG. 1 illustrating the auxiliary unit mounted therein, FIG. 4 is a sectional side elevational view of the support bracket of FIG. 1 on the line IV—IV of FIG. 3 also illustrating the auxiliary unit mounted therein, FIG. 5 is a rear elevational view of the support bracket of FIG. 1 with the auxiliary unit mounted therein, FIG. 6 is another side sectional view of the support bracket of FIG. 1 with the auxiliary unit mounted therein, FIG. 7 is a perspective view of an in situ unit, in this case, a switch which has been disengaged from a patress box prior to mounting of the support bracket of FIG. 1, FIG. 8 is another perspective view of the support bracket of FIG. 1 being mounted between the switch and patress box of FIG. 7, FIG. 9 is a perspective view of the support bracket of FIG. 1 illustrated mounted between the switch and patress box of FIG. 7, FIG. 10 is a front elevational view of an in situ unit, in this case, a switch illustrating the support bracket of FIG. 1 mounted in four different orientations each of 90° to each other, FIG. 11 is a circuit diagram of the auxiliary unit illustrated mounted in the support bracket of FIG. 1, FIG. 12 is a graphical representation of the operation of the auxiliary unit of FIG. 11, FIG. 13 is a graph illustrating power consumption of the auxiliary unit of FIG. 11, FIG. 14 is a front elevational view of a support bracket according to another embodiment of the invention, FIG. 15 is a perspective view of the support bracket of FIG. 14 with portion of the support bracket in a different position, FIG. 16 is a perspective view of a support bracket according to another embodiment of the invention, FIG. 17 is a perspective view of a support bracket according to a further embodiment of the invention having an auxiliary unit integral therewith, and FIG. 18 is another perspective view of the support bracket of FIG. 17 showing portion of the support bracket in a different position.

Referring to the drawings and initially to FIGS. 1 to 13 there is illustrated a support bracket according to the invention indicated generally by the reference numeral 1 for connecting an auxiliary electrical unit, in this case, an electrical timer unit 2 to an in situ electrical unit, namely, an electrical switch 3 of an immersion heater circuit (not shown), see FIGS. 7 to 9. The timer unit 2 is electrically connected to the switch 3 in parallel with the switch 3 so that the timer unit 2 operates the immersion heater (not shown) at desired timed intervals. The support bracket 1 is particularly suitable for connecting the timer unit 2 to an electrical switch 3 which is either mounted in situ on a wall 4, or as in the present case, mounted in a patress box 5. The patross box 5 is flush mounted in the wall 4, in other words, is recessed into the wall 4. Cables 7 of the immersion heater circuit extend from a conduit (not shown) into the patross box 5 and are connected to the switch 3. A pair of screws 9 secure the electrical switch 3 to the patress box 5 as will be well known by those skilled in the art. The support bracket 1 as will be described in detail below is mounted between the switch 3 and the patress box 5 as illustrated in FIGS. 8 and 9. Additionally the support bracket is so constructed that it may be mounted between the switch 3 and patress box 5 without the need for disconnecting the cables 7 from the switch 3.

The support bracket 1 is of injection moulded plastics material and comprises a main framework 10 having a pair of spaced apart side members 11 joined by a top end member 12 and a lower end member 14. An intermediate member 15 extends between the side members 11 substantially half way between the top and lower members 12 and 14. The main framework 10 forms a mounting means, namely, a mounting frame 18 for mounting the support bracket 1 between the switch 3 and the patress box 5, and a support means, namely, a support frame 19 for supporting the timer unit 2 therein, as will be described below. The mounting frame 18 is formed by portion of the side members 11, the lower end member 14 and the intermediate end member 15 which together form a cable accommodating means, namely, a cable accommodating aperture 20 for accommodating the cables 7 from the patress box 5 to the switch 3. So that the mounting frame 18 can be engaged between the switch 3 and the patress box 5 without the need for disconnecting the cables 7 from the switch 3, a portion 25 of the main frame 18 is separable from the main frame 18 at 21 and 22 to form an entry means, namely, an entry gap 23 in the mounting frame 18 through which the cables 7 may be entered into the cable accommodating aperture 20. The portion 25 of the mounting frame 18 which extends between the positions 21 and 22 act as a closure means, namely, a closure member 25 for closing the entry gap 23 after the cables 7 have been entered into the cable accommodating aperture 20. In this embodiment of the invention the closure member 25 is formed by one leg of the mounting frame 18, namely, the lower end member 14 and part of two adjacent legs of the mounting frame 18, namely, part of the side members 11. Retaining means, namely, spigots 26 of rectangular cross-section extend from the ends of the closure member 25 for engaging corresponding slots 27 in the side members 11 with a snap fit action for releasably retaining the closure member 25 in the main framework 10. The lower end member 14 and the portions of the side members 11 forming the mounting frame 18 define three side of the outer periphery of the electrical switch 3.

The mounting frame 18 defines a pair of engagement faces 28 and 29 for engaging an inner face 30 of the electrical switch 3, namely, the face of the switch 3 from which the cables 7 extend and for engaging the patress box 5 or wall 4 as the case may be. The engagement faces 28 and 29 are such that the support bracket 1 is reversible, as will be described below, so that the engagement face 28 may engage the switch 3 or patress box 5 and vice versa.

Four brackets 33 which carry through bores 34 extend inwardly into the cable accommodating aperture 20 from the side members 11, lower member 14 and intermediate member 15, respectively, for accommodating the screws 9 for securing the support bracket 1 between the switch 3 and the patress box 5. Four brackets 33 are provided so that the support bracket 1 may be mounted between the switch 3 and patress box 5 in four different orientations as can be seen in FIG. 10. When the support bracket 1 is mounted with the support frame 19 vertically above or below the switch 3 the screws 9 engage the brackets 33 extending from the side members 11. Where it is desired to mount the support bracket 1 with the support frame 19 on either side of the switch 3 the screws 9 engage the brackets 33 extending from the lower end member 14 and the intermediate member 15.

The support frame 19 is formed by part of the side members 11, the top end member 12 and the intermediate member 15 which forms a common member with the main frame 18. The support frame 19 defines a receiving aperture 36 for releasably receiving the timer unit 2. In this embodiment of the invention the timer unit 2 comprises a housing 37 of injection moulded plastics material having a square base 38, side walls 39, a top end wall 40 and a lower end wall 41. A front panel 42 as will be described below closes the housing 37. The housing 37 is described in further detail below. The receiving aperture 36 is square and substantially defines the housing 37. The top end wall 12 and the portions of the side walls 11 which form the support frame 19 are wider than the portions which form the mounting frame 18 for accommodating and supporting the timer unit 2 in the receiving aperture 36. The top end member 12 and the side members 11 forming the support frame 19 define a first face 45 of the support frame 19, and the top end member 120 side members 11 and the intermediate members 15 form a second face 46 of the support frame 19. The first face 45 is substantially co-planar with the engagement face 28 of the mounting frame 18 while the plane of the second face 46 is spaced apart from the plane of the engagement face 29. The reason for this is described in detail below. Securing means comprising elongated projections 48 extend inwardly into the receiving aperture 36 for releasably engaging corresponding indentations 50 in the housing 37 for releasably securing the timer unit 2 in the receiving aperture 36. The projections 48 extend from the side members 11, the top end member 12 and a bracket 49 extending from the intermediate member 15, and the indentations are formed in the side walls 39 and top and lower walls 40 and 41 of the housing 37.

Communicating means for accommodating wires, in this case, a pair of wires 53 and 54 for electrically connecting the timer unit 2 to the switch 3 is provided by a communicating aperture 55 formed by stepping a surface 56 of the intermediate member 15 back from the engagement face 28 and first face 45 of the mounting frame 18 and support frame 19, respectively. The communicating aperture 55 extends between and communicates the cable accommodating aperture 20 with the receiving aperture 36. A locating means for locating and retaining the wires 53 and 54 in the communicating aperture 55 comprises a cover member 58. The cover member 58 is carried on a pair of carrier arms 59 which are in turn pivotally connected to the side walls 11 by pivot pins 60. The cover member 58 is pivotal from an open position illustrated in FIGS. 2 and 6 spaced apart from the communicating aperture 55 for facilitating entry of the wires 53 and 54 through the aperture 55 to a closed position illustrated in FIG. 4 closing the aperture 55 for securely locating and retaining the wires 53 and 54 therein. A latch 61 extending from the cover member 58 releasably engages a receiver 62 formed between the bracket 49 and the intermediate member 15 with a snap fit action for securing the cover member 58 in the closed position.

A timer circuit 70 described below with reference to FIG. 11 is located in the housing 37 of the timer unit 2. The timer circuit 70 includes a relay 71 from which the wires 53 and 54 extend for operating the immersion heater. A liquid-crystal display 76 is located in the front panel 42 of the housing 37 and is connected to the timer circuit 70 for displaying time and for enabling the on and off times at which the immersion heater is to be switched on and off to be selected. A keypad 77 located in the front panel 42 and connected to the timer circuit 70 is provided for inputting the on and off times and for activating the liquid crystal display 76 for displaying the time and the on and off times. The housing 37 comprises a safety panel 78 which is spaced apart from the base 38 and which defines a slot 79 with the base 38 for accommodating the wires 53 and 54 from the housing 37. The slot 79 extends almost completely around the housing 37 for accommodating mounting of the timer unit 2 in the receiving apertures 36 in any of four different orientations at 90° to each other, depending on the orientation with which the support bracket 1 is mounted to the in situ switch 3. The safety plate 78 is secured to the housing 37 by a mounting plate 80 located on the base 38. An opening 81 in the base 38 adjacent the mounting plate 80 accommodates the wires 53 and 54 from the housing 37 into the slot 79.

In use, to mount and connect the timer unit 2 to the switch 3, the screws 9 are loosened and the switch 3 is pulled apart from the patress box 5 with the cables 7 still connected to the switch 3, see FIG. 7. The support bracket 1 with the closure member 25 removed is located between the switch 3 and the patress box 5 with the portion of the main framework 10 forming the mounting frame 18 located between the switch 3 and the patress box 5. Where the support bracket 1 is being used with a patress box 5 which is flush mounted in the wall 4, the main framework 10 is arranged so that the engagement face 28 abuts the patress box 5 and the engagement face 29 of the mounting frame 18 abuts the face 30 of the switch 3, see FIGS. 8 and 9. In this way, the first face 45 of the support frame 19 lies adjacent the wall 4 and the top member 12 and side members 11 forming the support frame 19 extend forwardly from the first face 45. In this case, the timer unit 2 is entered into the aperture 36 through the second face 46.

However, should it be desired to use the support bracket 1 with a patress box 5 which is surface mounted on the wall 4, the support bracket 1 is reversed. In other words, the mounting frame 18 of the main framework 10 is located between the switch 3 and the patress box 5 so that the engagement face 28 of the mounting frame 18 abuts the switch 3 and the engagement face 29 abuts the patress box 5. In this way, the second face 46 of the support frame 19 lies adjacent the wall 4, and the timer unit 2 is entered into the receiving aperture 36 through the first face 45.

The width W of the top end member 12 and side members 11 forming the support frame 19 is such that the off-set H between the engagement face 29 and the second face 46 is substantially the width of a standard surface mounted patress box 5 so that when the support bracket 1 is used with a surface mounted patress box the second face 46 substantially abuts the wall 4.

Prior to locating the mounting frame 18 between the switch 3 and the patress box 5 the timer unit 2 is mounted in the receiving aperture 36 through the appropriate face 45 or 46. In this case, the timer unit 2 is entered into the receiving aperture 36 through the second face 46 until the projections 48 engage the indentations 50 in the timer unit 3. The two wires 53 and 54 are led through the communicating aperture 55 and the cover member 58 is pivoted into the closed position with the latch 61 secured in the receiver 62.

Once the mounting frame 18 is located between the switch 3 and the patress box 5 with the cables 7 in the cable accommodating aperture 20, the closure member 25 is secured to the main framework 10 by engaging the spigots 26 in the corresponding slots 27 with snap fit action. The wires 53 and 54 are then connected into the relevant terminals of the switch 3 by merely loosening the screws retaining the cables 7 in the relevant terminals of the in situ switch 3, entering the wires 53 and 54 in the terminals, and then tightening the screws of the relevant in situ switch terminals thereby securing the wires 53 and 54 in the terminals with the cables 7. The support bracket 1 is then oriented so that the timer unit 2 is in the desired orientation relative to the switch 3. In FIGS. 8 and 9 the timer unit 2 is illustrated in an orientation vertically above the switch 3. The screws 9 are then entered through the switch 3, the bores 34 in the appropriate brackets 33, and in turn, engaged in correspondingly threaded sockets 65 in the patress box 5. The screws 9 are tightened so that the support bracket 1 is securely located between the switch 3 and the patress box 5.

It will be appreciated that where it is desired to mount the support bracket 1 in a different orientation, as for example, any of the other three orientations illustrated in FIG. 10 the timer unit 2 when being entered in tie receiving aperture 36 is entered with the panel 42 correctly oriented for viewing of the display 76 and the keypad 77. The fact that the housing 37 and the receiving aperture 36 are square facilitates entering the timer unit 2 in the receiving aperture 36 in any desired orientation at 90° intervals.

As discussed above, the advantages of the support bracket 1 according to the invention are many. Firstly, the support bracket 1 can be mounted to an in situ unit without the need for disconnecting cables feeding the in situ unit. Secondly, by virtue of the fact that the support bracket is mounted directly onto the in situ unit there is no need for additional fixings for fixing the auxiliary unit and/or the support bracket to a wall. The fixings for fixing the in situ unit to the wall are used for fixing the support bracket, and in turn the auxiliary unit to the in situ unit and to the wall. Thus, there is no need for drilling, plugging, recessing and/or screwing additional fittings to the wall. Accordingly, the support bracket and auxiliary unit may be connected and fitted simply and easily to an in situ unit with minimum skills and effort being required, and in a relatively short period of time at minimum cost.

Referring now to FIGS. 11 to 13, the timer circuit 70 of the timer unit 2 will now be described. The relay 71 is a bi-state remanent relay comprising a pair of coils RL1A and RL1B for operating contacts 73 of the relay 71. The wires 53 and 54 are connected to the respective contacts 73 for operating the immersion heater (not shown). A current pulse through the coil RL1A switches on the relay 71, in other words, closes the contacts 73, while a current pulse through the coil RL1B switches off the relay 71, namely, opens the contacts 73. A control means, namely, a microcontroller U1 controls the operation of the timer circuit 71. A power supply means comprising a battery B1 powers the time circuit 70 and operates the relay 71 independently of the switch 3. In this embodiment of the invention the battery B1 is a type AA alkaline battery of 1.5 volts. A pair of switching transistors Q1 and Q2 connected in compound configuration associated with the relay coil RL1A provide a current pulse through the coil RL1A for switching on the relay 71. A pair of transistors Q3 and Q4 connected in similar compound configuration associated with the relay RL1B apply a current pulse through the relay RL1B for switching off the relay 71. The transistors Q2 and Q3 are connected in series with the respective relay coils RL1A and RL1B across the 1.5 volt supply from the battery B1 and act as coil switching transistors. Both transistors Q2 and Q3 have particularly low saturation voltage characteristics to provide maximum operating voltage typically, 1 volt across the coils RL1A and RL1B. The transistors Q1 and Q4 are driver transistors for switching the transistors Q2 and Q3, respectively. The transistors Q1 and Q4 are high current gain transistors for enabling operation of the relay 71 with the low current output of the microcontroller U1 which typically is in the microamp region. A pulse steering circuit 75 under the control of the microcontroller U1 selectively and alternately pulls the base of the driver transistors Q1 and Q4 for a short period for switching the relay 71. Back emf suppressing diodes D1 and D2 are connected across the relay coils RL1A and RL1B, respectively.

The pulse steering circuit 75 comprises a pair of inverters U2 and U3 and an RC timing circuit, namely, a resistor R1 and a capacitor C1 for pulling the base of the driver transistor Q1 low for a relatively short period, typically, 10 to 15 milliseconds for switching on the transistor Q2 for applying a current pulse through the coil RL1A of the relay 71. An inverter U4 and an RC timing circuit, namely, a resistor R2 and a capacitor C2 pulls the base of the driver transistor Q4 low for switching on the transistor Q3 for applying a current pulse for approximately 10 to 15 milliseconds through the coil RL1B for switching off the relay 71. An output A from the microcontroller U1 is applied to the input of the inverter U2 and the RC timing circuit associated with the inverter U4. The time constant of the respective RC circuits is such as to ensure that the current pulse through the coils RL1A and RL1B will last for the duration of 10 to 15 milliseconds. Referring now to FIG. 12, the operation of the timer circuit 70 will be described. Graph 1 of FIG. 12 illustrates the output on the line A from the microcontroller U1. Graph 2 illustrates the output H from the inverter U4. Graph 3 illustrates the output G of the inverter U3. Graph 4 illustrates the voltage across the coils RL1A and RL1B of the relay 71. In normal operation the output of the inverters U3 and U4 at G and H of the steering circuit 75 is normally high, thus holding the driver transistors Q1 and Q4 switched off, see graphs 2 and 3. In this state the coil switching transistors Q2 and Q3 are likewise switched off and no current flows through the coils RL1A and RL1B. Thus, the relay contacts Y3 remain in their current state until a pulse current flows through the relay coil RL1A or RL1B as the case may be for changing the state of the relay contacts 73. The outputs G and H of the inverters U3 and U4 are held high by virtue of the fact that inputs E and F of the inverters U3 and U4, respectively, are connected to ground through the resistors R1 and R2, respectively. Only a change in state of the output signal from the microcontroller U1 on the line A places a low on the outputs G and H of the inverters U3 and U4, and the outputs G and H on which the low appears depends on whether the line A is going high or low, see graphs 1 to 3. The low on the outputs G or H only remains low for the period of the time constant of the corresponding RC timing circuit. In this embodiment of the invention when the line A goes from low to high, see graph 1, a current pulse is passed through the relay coil RL1A thus switching on the relay 71. When the line A goes from high to low, see graph 1, a current pulse is passed through the relay coil RL1B which switches off the relay 71.

In more detail as the line A goes from low to high, see graph 1 the output B of the inverter U2 goes low thus leaving the signal on the output G of the inverter U3 high and unaffected, see graph 3. However, the line A going high causes the input F of the inverter U4 to go high for a period corresponding to the time constant of the RC circuit comprising resistor R2 and capacitor C2. This, puts a low on the output H of U4 for a similar period, see graph 2, thus, switching on the driver transistor Q1 which in turn switches on the coil switching transistor Q2 and current flows through the relay RL1A switching on the relay 71, see graph 4. Current continues to flow in the relay coil RL1A for so long as a low remains on the output H of the inverter U4, in other words, for the period of the time constant of the RC circuit comprising resistor and capacitor R2 and C2.

On the other hand on the line A going from high to low the output H of the inverter U4 remains unaffected and high, see graph 2. However, the output B of the inverter U2 goes high, thus causing the input E of the inverter U3 to go high for the period of the time constant of the RC circuit comprising resistor R1 and capacitor C1. Accordingly, the output G of the inverter U3 goes low for the same time period, see graph 3. This thus switches on the driver transistor Q4 and the coil switching transistor Q3 thereby allowing a current to flow through the relay coil RL1B for switching off the relay 71 in similar fashion as the relay coil RL1A switches on the relay 71, see graph 4.

In this particular embodiment of the invention the relay characteristics require that a current flows through the respective coils RL1A and RL1B for a period of 10 to 15 milliseconds for operating the relay, and accordingly, since the time constant of the RC timing circuits is such as to maintain the current flowing in the relay coils for 10 to 15 milliseconds, it is sufficient for triggering the relay 71 from one state to the other.

By virtue of the fact that the coil switching transistors Q2 and Q3 have particularly low saturation voltage characteristics, the voltage loss across the transistors Q2 and Q3 is minimal. In this case, less than 0.25 volts, thus, a voltage of approximately one volt is available across the relay coils RL1A and RL1B for operating the relay 71. Furthermore, by virtue of the fact that the driver transistors Q1 and Q4 are a high current gain transistors, the current required for switching the transistors Q1 and Q4 is relatively low, thus, enabling switching of the driver transistors Q1 and Q4 with a current of approximately 50 microamps. This thus provides a high current of the order of up to 2 Amps through the relay coils RL1A and RL1B for switching the relay 71.

Referring now to FIG. 13 there is illustrated a graph of the current requirement of the timer circuit 70 which is required from the battery B1 over a twenty-four hour period of a typical switching sequence where the timer unit 2 is used for switching on and off the immersion heater (not shown) at desired time periods. To switch the immersion heater on for five time periods during the twenty-four hour time cycle, ten 10 millisecond pulses are required, five for switching on the relay 71 five times and five for switching the relay 71 off five times. Thus, the total on time of the coils RL1A and RL1B in a twenty-four hour time cycle is 0.1 seconds.

Total number of seconds in 24 hours: 86400.
Duty cycle=1:864000

Average current consumption for the coils RL1A and RL1B is 0.85 amp divided by duty cycle or $$\frac{0.85}{864000} = 0.983 \times 10^{-6} \text{ or } 0.98 \text{ Microamp.}$$

Therefore, the average switching current is only 0.98 Microamps.

Add this average of 0.98 to the average for the microcontroller U1 of 5 Microamps as follows:
Total average=5+0.98=5.98 or 6 microamps rounded.

The capacity of an alkaline AA cell is 2.2 ampere hours or greater. If we divide 2.2 by the total average current, the total working hours available is:

2.2 divided by $6 \times 10^{-6} = 2.2 \times 10^6$ divided by 6=366666 hours or 366666 hours divided by 8760=41.85 years.

But of course in reality this is impossible because the battery has an intrinsic leakage current and will deteriorate without load.

However, the quality of modern alkaline cells has improved considerably and a shelf life of 4 years is common. Shelf life is defined as when the cells capacity is reduced to 85% of nominal. Therefore an AA cell with a capacity of 1.87 ampere hours. After 4 years the cell can still deliver far in excess of the current requirements of the timer circuit 70 (peak 850 mA).

Another interesting phenomenon occurs in relation to the invention, namely a cell's ability to recover chemically after a short burst of power, keeping in mind that the circuit consumes real power for only 10 milliseconds. The inventor has tested very discharged cells which recovered in 4 to 5 minutes after delivering an 850 mA pulse for 10 milliseconds. This is an added bonus enhancing longevity.

Because the timer unit 2 is provided with an independent power supply, a neutral power connection is not required. This, thus, simplifies the installation and connection of the support bracket and the auxiliary unit. The only electrical requirement is to connect the wires 53 and 54 in parallel with the switch 3. Alternatively, if the relay of the timer unit 2 is to be connected in series with the switch 3, all that is required is to break the live connection going to the switch 2, in other words, disconnect the live cable from the switch and connect the wire 53 into the connection in the switch 2 from which the live cable has been removed, and connect the live cable to the wire 54. In FIG. 18 as will be described below a terminal block 127 is illustrated at the free end of the wire 54 for connecting the live wire of the cables 7 to the wire 54. This thus completes the electrical wiring for wiring the timer unit 2 into the in situ switch 3, a neutral connection not being required.

Referring now to FIGS. 14 and 15 there is illustrated a support bracket according to another embodiment of the invention indicated generally by the reference numeral 100 for connecting an auxiliary electrical unit to an in situ electrical unit. In this case, neither the auxiliary unit or switch is illustrated. However, as mentioned above the auxiliary unit may be any desired unit, for example, a timer similar to that already described, a dimmer switch, a metering device for the transmission and/or reception of data to or from a remote location, or indeed any other desired auxiliary unit. The in situ unit may be a switch, for example, a light circuit switch, an immersion heater switch, a socket or the like.

The support bracket 100 is substantially similar to the support bracket 1, and similar components are identified by the same reference numerals. The main difference between the support bracket 100 and the support bracket 1 is in the mounting frame 18. In this embodiment of the invention an entry gap 101 is provided to the cable accommodating aperture 20 between locations 102 and 103 on the mounting frame 18. A closure member 104 closed the gap 101. The closure member 104 is hingedly connected to one of the side members 11 at 102, and is hingeable from an open position, see FIG. 15, permitting cables extending from the in situ unit to be entered into the cable accommodating aperture 20 without the need for disconnecting the cables to a closed position illustrated in FIG. 14 closing the gap 101. Retaining means comprising a spigot 105 of rectangular cross-section extending from the closure member 104 is engagable with a corresponding slot 106 in the mounting frame 18 with a snap fit type action for releasably retaining the closure member 25 in the closed position. As can be seen in this embodiment of the invention the closure member 104 is formed by two adjacent legs of the main frame 18, namely, by portion of the side member 11 and the lower end member 14. Brackets 33 carrying bores 34 are provided on the two legs of the closure member 104 so that irrespective of the orientation in which the support bracket 1 is mounted to the in situ unit one of the screws 9 will pass through the bore 34 of one of the brackets 33 carried by the closure member 104, thereby the screws 9 retain the closure member 104 in the closed position when the support bracket 1 is secured between the auxiliary unit and the in situ unit. A communicating aperture 107 through the intermediate member 15 accommodates wires from the auxiliary unit to the in situ unit.

Referring now to FIG. 16 there is illustrated a support bracket according to a further embodiment of the invention indicated generally by the reference numeral 110. The support bracket 110 is substantially similar in principle to the support bracket 1 and similar components are identified by the same reference numerals. The main difference between the support bracket 1 is in the shape of the main framework 10. In this embodiment of the invention the side members 11 and top, lower and intermediate members 12, 14 and 15 are of substantially similar cross-section. An entry gap 111 is provided in the lower member 14 for entry of cables into the cable accommodating aperture 20. The gap 111 is closed by a closure member 112 which is pivotally connected by a pivot pin 114 to the lower end member 14 and is pivotal from an open position illustrated in FIG. 16 to a closed position with the closure member 112 aligned with the lower end member 14. In this embodiment of the invention the communicating means is provided by a communicating aperture 116 formed in the intermediate member 15 which communicates the cable accommodating aperture 20 with the receiving aperture 36 for accommodating one or more wires from the auxiliary unit which is not shown to the in situ unit which is also not shown.

Referring now to FIGS. 17 and 18 there is illustrated a support bracket according to a further embodiment of the invention indicated generally by the reference numeral 120. The support bracket 120 is substantially similar to the support bracket 1 and similar components are identified by the same reference numerals. The main difference between the support bracket 120 and the support bracket 1 is that the auxiliary unit in this case, a timer unit 121 which is similar to the timer unit 2 is integrally formed with the support bracket 120. In other words, the support frame 19 of the support bracket 120 forms the housing for the timer unit 121. The mounting frame 18 of the support bracket 120 is provided with an entry gap 122 for permitting entry of cables into the cable accommodating aperture 20. A closure member 123 closes the gap 122. The closure member 123 is pivotally connected at 124 to one of the side members 11. A retaining means provided by a spigot 125 extends from the closure member 123 for engaging a corresponding slot 126 in the lower end member 14 with snap fit action for retaining the closure member 123 in the closed position. A terminal block 127 is provided at the end of the wire 54, should it be desired to connect the relay 71 of the timer unit 121 in series with the in situ unit 3. In which case, the live wire of the cables 7 connected to the in situ unit 3 is disconnected and connected to the terminal block 127. The wire 53 is then connected into the terminal of the in situ unit 3 from which the live wire was removed.

While a number of support brackets of specific construction have been described, it will be appreciated that support brackets of other shape and construction may be provided.

It will be appreciated that the support bracket may be provided with a support frame and a mounting frame of different shape. In particular, it will be appreciated that the mounting frame may be shaped to suit the shape, and in particular, the outer peripheral shape of the in situ unit. It will also be appreciated that the support frame may likewise be shaped to suit the shape of the auxiliary unit. While the support means and mounting means have been described as comprising a support frame and a mounting frame, other suitable support and mounting means may be provided. It will also be appreciated that while entry means for entering a cable into the cable accommodating means has been described as being provided by an entry gap formed in the mounting frame, other entry means may be provided. Indeed, in certain cases, it is envisaged that the cable accommodating aperture would be provided with a diagonal dimension which would be greater than the minimum transverse or longitudinal dimensional across the front face of the in situ unit to facilitate passing the in situ unit through the cable accommodating aperture with the in situ unit oriented so that its longitudinal or transverse dimension is substantially aligned with the diagonal dimension of the cable accommodating aperture. In such cases, it will be appreciated that there would be no need for an entry gap in the mounting frame.

While particular types of communicating means for communicating the cable accommodating aperture with the receiving aperture, any other suitable communicating means may be provided.

It is envisaged that the support bracket may be used with any other type of timers, also with indicating lights, switches, controllers or interrogative, interactive or remote control sensing devices of any type. The support bracket of the invention may be used particularly advantageously for interconnection of units where one of the units is wall-mounted, however, it is envisaged that it may alternatively be used for hand-held instruments or other appliances where two units are to be interconnected. Such appliances include units mounted in a panel, control box, rack, or on machines or pumps. Applications of the support bracket include random light switching for security purposes, light dimmers, laboratory timers, residual current devices, high quality mains filters for sensitive instruments and computer applications, mains-borne remote control units, mains-borne security applications, and mains-borne computer applications such as networks and metering and telemetry applications.

It will be appreciated that the invention enables intervention in a simple manner, in an existing installed electrical circuit which may have appliances, equipment or other devices connected to it by placing at any convenient and appropriate location in the circuit, including at a switch, fused link, socket, outlet, isolator, circuit breaker, residual current device, interface unit, junction box, ceiling rose, ceiling switch, or other such electrical unit, a desired electrical or electronic unit to command, control, measure, protect, switch, interrogate, interact with or exchange information with, said circuit or the equipment and appliances it supplies.

The invention is not limited to a single-gang application but may be employed with two or multi-gang connections where convenient.

The subsequent functioning of the electrical or electronic units so installed may be effected manually, mechanically or automatically, for instance, in response to a pre-set value of, or effect in the electric circuit, or in response to a predetermined externally sensed event such as sound level, temperature or the intensity of light. Groups of them may receive commands from, interact with, or report to remotely located equipment and devices enabling companies to control a multitude of circuits for instance, or utilities to switch a multitude of appliances or remotely read a multitude of meters.

In fact, the support switch enables the placing and connection of almost any type of device which is electrically or electronically powered, or the outputs of which can be converted to electrical signals in a particularly quick, safe and simple manner from both electrical connection and mechanical mounting points of view to an electrical circuit or circuits so giving control over, or interaction with it, or them. Further, a high degree of immunity from electrical and electromagnetic noise, spurious signals and from mechanical stress due to overheating or continuous exposure to heat arising internally in the device so fitted, is provided.

The independent power source is not confined to an alkaline battery—any other suitable type of battery may be used including a lithium battery. Electromagnetic or solar radiation could provide the power, pressure of sound or other pressure, or any other available or incident power source could be used. The power for the device could of course be obtained from the circuit to which the device is fitted but thereby losing the advantages of the independent power source.

The following comments may also be made. The invention may embrace or encompass technology for information interchange, for example, security sensors, detectors for monitoring any radiant energy, sounders, annunciators, intercoms or modems for information interchange. The communication modes may be ultra sound or audible sound, light energy, any electromagnetic radiation, solar or any other incident energies, by means of or employing all forms of modulation and encoding, including spread spectrum, mains-borne carrier and encoding systems, radio paging, microwave, optic or laser transmission and encoding, and any electrical magnetic or radio carrier or modulation techniques. A factory could readily retrofit a variety of devices so that certain process heaters would come on automatically before the first shift, lights could be switched off automatically when ambient lighting reached a certain intensity, security devices would automatically come into operation at nightfall, machines and devices could be controlled by intelligent systems over, for example, radio carriers, without need to install control wiring (particularly useful for continuous processes or in hazardous or hostile conditions). Residual current devices could be retro fitted throughout.

It is envisaged that a water temperature sensor in the form of a metal clip onto a water pipe may be connected to the controller and used to indicate temperature or to switch on or off the immersion heater and, by sliding it into different positions on the pipe, to give an added degree of control, reliability or economic operation to the functioning of the immersion heater.

We claim:

1. A support bracket for connecting an auxiliary electrical unit (2) to an in situ unit (3), characterized in that the support bracket (1) comprises a mounting means (18) for locating between the in situ unit (3) and a patress box (5) or a wall (4) to which the in situ unit (3) is originally mounted and for mounting the in situ unit (3) to the patress box (5) or wall (4), a support means (19) extending from the mounting means (18) for supporting the auxiliary unit (2), a cable accommodating means (20) being provided for accommodating a cable (7) from the patress box (5) or wall (4) through the support bracket (1) to the in situ unit (3), one of the cable accommodating means (20) and the mounting means (18) being adapted for permitting location of the mounting means (18) between the in situ unit (3) and the patress box (5) or wall (4) and for permitting mounting of the in situ unit (3) on the mounting means (18) without disconnection of the cable (7) from the in situ unit (3), and a communicating means (55) being provided for accommodating an electrical wire (53, 54) from the in situ unit (3) to the auxiliary unit (2).

2. A support bracket as claimed in claim 1 characterized in that the cable accommodating means (20) extends through the mounting means (18).

3. A support bracket as claimed in claim 1 characterized in that the cable accommodating means (20) is formed by a cable accommodating aperture (20) defined by the mounting means (18).

4. A support bracket as claimed in claim 1 characterized in that an entry means (23) is formed in the mounting means (18) for permitting entry of a cable (7) into the cable accommodating means (20).

5. A support bracket as claimed in claim 4 characterized in that the entry means (23) is an entry gap (23).

6. A support bracket as claimed in claim 5 characterized in that a closure means (25) is provided for closing the entry gap (23), the closure means (25) being releasably engageable with the mounting means (18).

7. A support bracket as claimed in claim 6 characterized in that a retaining means (26, 27) is provided for retaining the closure means (25) in engagement with the mounting frame (18) or in the closed position.

8. A support bracket as claimed in claim 6 characterized in that the mounting means (18) comprises a mounting frame (18) extending around the cable accommodating means (20), the entry gap (23) being formed in the mounting frame (18), and the closure means (25) comprises a closure member (25) forming part of the mounting frame (18).

9. A support bracket as claimed in claim 8 characterized in that the closure member (25) is hingedly connected to the mounting frame (18), the closure member (25) being hingable from an open position with the entry gap (23) open to a closed position with the entry gap (23) closed.

10. A support bracket as claimed in claim 8 characterized in that the closure member (25) forms part of two adjacent legs of the mounting frame (18), one end of the closure member (25) being hingeably connected to the mounting frame (18), and the other end of the closure member (25) being releasably engageable with the mounting frame (18).

11. A support bracket as claimed in claim 8 characterized in that at least one screw accommodating opening (34) is formed in the mounting frame (18) for facilitating securing of the mounting frame (18) to the in situ unit (3) and one of the screw accommodating openings (34) is located on the closure means (25) for retaining the closure means (25) in engagement with the mounting frame (18) or in the closed position when the mounting frame (18) is mounted to the in situ unit (3).

12. A support bracket as claimed in claim 1 characterized in that the mounting means (18) defines portion of the periphery of the in situ unit (30) and the mounting means (18) defines a pair of opposite engagement faces (28, 29), one of the engagement faces (28, 29) being for engaging a face (30) of the in situ unit (3) from which the cable (7) extends, the other engagement face (28, 29) being for engaging the patress box (5) or the wall (4) to which the in situ unit (3) is mounted, the support bracket (1) being reversible so that either engagement face (28, 29) may engage the in situ unit (3).

13. A support bracket as claimed in claim 1 characterized in that the mounting means (18) is engageable with the in situ unit (3) in at least two different orientations corresponding to different orientations of the support bracket (1) relative to the in situ unit (3).

14. A support bracket as claimed in claim 13 characterized in that the support bracket (1) may be mounted in at least two different orientations at 90° to each other relative to the in situ unit (3).

15. A support bracket as claimed in claim 1 characterized in that the support bracket (1) is for mounting the auxiliary unit (2) to the in situ unit (3) wherein the in situ unit (3) is of four sided shape, the mounting means (18) defining three sides of the in situ unit (3), and the support means (19) comprises a support frame (19) extending from the mounting means (18).

16. A support bracket as claimed in claim 1 characterized in that the communicating means (55) extends between the mounting means (18) and the support means (19).

17. A support bracket as claimed in claim 16 characterized in that a locating means (58) is provided for locating (53, 54) a wire in the communicating means (55).

18. A support bracket as claimed in claim 1 characterized in that the support bracket comprises the auxiliary unit (2) mounted in the support means (19).

19. A support bracket as claimed in claim 18 characterized in that the auxiliary unit (2) comprises a relay (71) and a control means (70) for controlling operation of the relay (71), the relay (71) being for connection to the in situ unit (3) through the communicating means (55).

20. A support bracket as claimed in claim 19 characterized in that the auxiliary unit (2) is powered independently of the in situ unit (3), and the auxiliary unit (2) comprises a timing means (U1), the control circuit (70) being responsive to the timing means (U1) for switching the relay (71) from one state to another.

* * * * *